United States Patent
Zhou et al.

(10) Patent No.: US 12,549,471 B2
(45) Date of Patent: Feb. 10, 2026

(54) METHODS AND SYSTEM FOR MULTI-ACCESS PROTOCOL DATA UNIT SESSION

(71) Applicant: ZTE CORPORATION, Guangdong (CN)

(72) Inventors: Xingyue Zhou, Shenzhen (CN); Jinguo Zhu, Shenzhen (CN); Menghan Wang, Shenzhen (CN); Shuang Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 55 days.

(21) Appl. No.: 18/519,572

(22) Filed: Nov. 27, 2023

(65) Prior Publication Data

US 2024/0106734 A1 Mar. 28, 2024

Related U.S. Application Data

(63) Continuation of application No. PCT/CN2021/110974, filed on Aug. 5, 2021.

(51) Int. Cl.
*H04L 45/24* (2022.01)
*H04L 45/302* (2022.01)

(52) U.S. Cl.
CPC ............ *H04L 45/24* (2013.01); *H04L 45/302* (2013.01)

(58) Field of Classification Search
None
See application file for complete search history.

(56) References Cited

U.S. PATENT DOCUMENTS

| | | | | |
|---|---|---|---|---|
| 10,104,239 | B2* | 10/2018 | Gupta | H04L 65/1069 |
| 2011/0058479 | A1* | 3/2011 | Chowdhury | H04L 45/04 370/237 |
| 2014/0241153 | A1* | 8/2014 | Chowdhury | H04L 45/04 370/230 |
| 2022/0393972 | A1* | 12/2022 | Salkintzis | H04W 40/12 |

FOREIGN PATENT DOCUMENTS

| | | |
|---|---|---|
| CN | 110831094 A | 2/2020 |
| WO | WO-2020/184956 A1 | 9/2020 |
| WO | WO-2021/138511 A1 | 7/2021 |

OTHER PUBLICATIONS

Ha et al., "Support of a Multi-access Session in 5G Mobile Network", Apr. 10, 2020, IEEE, 2019 25th Asia-Pacific Conference on Communications (APCC) (2019, pp. 378-383) (Year: 2020).*

(Continued)

*Primary Examiner* — Davoud A Zand
(74) *Attorney, Agent, or Firm* — Foley & Lardner LLP

(57) ABSTRACT

A wireless communication method for use in a session management function is disclosed. The method comprises transmitting, to a wireless terminal, a steering rule for uplink data associated with a first protocol data unit session anchor of a multi-access protocol data unit session, wherein the multi-access protocol data unit session is associated with the first protocol data unit session anchor and a second protocol data unit session anchor.

16 Claims, 6 Drawing Sheets

(56) References Cited

OTHER PUBLICATIONS

3rd Generation Partnership Project; Technical Specification Group Services and System Aspects; Study on access traffic steering, switch and splitting support in the 5G system architecture (Release 16), 3GPP TR 23.793 V16.0.0 (Dec. 2018), 116 pages.
Extended European Search Report for EP Appl. No. 21952328.9, dated Jun. 13, 2024 (8 pages).
Huawei et al., "Update of solution for the UL CL case on the Multi-access PDU sessions", SA WG2 Meeting #129, S2-1810716, Oct. 19, 2018, Dongguan, China (11 pages).
International Search Report and Written Opinion for PCT Appl. No. PCT/CN2021/110974, mailed on Apr. 26, 2022 (6 pages).
Nokia et al., "Clarification on the CN tunnel info allocation and release", SA WG2 Meeting #137E (e-meeting), S2-2001821, Feb. 27, 2020, Elbonia (70 pages).
3rd Generation Partnership Project; Technical Specification Group Services and System Aspects; Procedures for the 5G System (5GS); Stage 2 (Release 16), 3GPP TS 23.502 V16.9.0 (Jun. 2021), 614 pages.
Communication pursuant to Article 94(3) EPC for EP Appl. No. 21952328.9, dated Sep. 30, 2025 (6 pages).

\* cited by examiner

METHODS AND SYSTEM FOR MULTI-ACCESS PROTOCOL DATA UNIT SESSION

CROSS-REFERENCE TO RELATED PATENT APPLICATIONS

This application is a Continuation of PCT Application No. PCT/CN2021/110974, filed Aug. 5, 2021, incorporated herein by reference in its entirety.

TECHNICAL FIELD

This document is directed generally to wireless communications, including but not limited to multiaccess protocol data unit (MA PDU) session.

BACKGROUND

The access traffic steering, switching and splitting (ATSSS) feature may be supported by a user equipment (UE) and/or a 5G core (5GC) network enabling an MA PDU service, which exchanges PDUs between the UE and a data network by simultaneously using one $3^{rd}$ generation partner project (3GPP) access network, one non-3GPP access network and two independent N3/N9 tunnels between a PDU session anchor (PSA) and a radio access network/access network (RAN/AN). The multi-access PDU connectivity service is realized by establishing an MA PDU session, i.e. a PDU session that may have user-plane resources on two access networks.

SUMMARY

The UE may request the MA PDU session when the UE is registered via both the 3GPP and non-3GPP accesses or when the UE is registered via only one access.

After the establishment of the MA PDU session and when there are user-plane resources on both access networks, the UE applies a network-provided policy (i.e., ATSSS rules) and considers local conditions (such as network interface availability, signal loss conditions, user preferences, etc.) for deciding how to distribute uplink traffics across the two access networks. Similarly, the PSA of the MA PDU session applies a network-provided policy (i.e., N4 rules) and feedback information received from the UE via the user-plane (such as access network unavailability or availability) for deciding how to distribute downlink traffics across the two N3/N9 tunnels and the two access networks. When there are user-plane resources on only one access network, the UE applies the ATSSS rules and considers local conditions for triggering the establishment or activation of the user plane resources over another access.

In certain scenarios, a branching point (BP) or an uplink classifier (UL CL) may be inserted in data path(s) of the MA-PDU session. However, it is unclear how to perform or adjust the ATSSS rules when the BP/UL CL is inserted on the data path(s) of the MA PDU session.

This document relates to methods, systems, and devices for the MA PDU session, and in particular to methods, systems, and devices for updating steering rules for the MA PDU session.

The present disclosure relates to a wireless communication method for use in a session management function. The method comprises transmitting, to a wireless terminal, a steering rule for uplink data associated with a first protocol data unit session anchor of a multi-access protocol data unit session, wherein the multi-access protocol data unit session is associated with the first protocol data unit session anchor and a second protocol data unit session anchor.

Various embodiments may preferably implement the following features:

Preferably or in some embodiments, the steering rule is transmitted in response to an insertion of a branching point or an uplink classifier in the multi-access protocol data unit session.

Preferably or in some embodiments, the steering rule indicates using an access traffic steering, switching, splitting, ATSSS, functionality to steer the uplink data associated with the first protocol data unit session anchor.

Preferably or in some embodiments, the steering rule indicates avoiding using a multipath transmission control protocol, MPTCP, functionality to steer the uplink data associated with the first protocol data unit session anchor.

Preferably or in some embodiments, the steering rule indicates steering the uplink data associated with the first protocol data unit session anchor to a branching point or an uplink classifier.

Preferably or in some embodiments, the branching point or the uplink classifier is comprised in the first protocol data unit session anchor or is deployed standalone.

Preferably or in some embodiments, the uplink data associated with the first protocol data unit session anchor comprises at least one of a prefix associated with the first protocol data unit session anchor or at least one internet protocol address associated with the first protocol data unit session anchor.

Preferably or in some embodiments, the wireless communication method further comprises transmitting, to a wireless network node and a gateway via which the wireless terminal accesses to a data network, tunnel information associated with a branching point or an uplink classifier associated with the first protocol data unit session anchor.

Preferably or in some embodiments, the wireless communication method further comprises transmitting, to the second protocol data unit session anchor, the steering rule.

Preferably or in some embodiments, the wireless communication method further comprises transmitting, to at least one of the wireless terminal or the second protocol data unit session anchor, an indication of removing the steering rule after a branching point or an uplink classifier associated with the first protocol data unit session anchor is removed.

The present disclosure relates to a wireless communication method for use in a wireless terminal. The method comprises receiving, from a session management function, a steering rule for uplink data associated with a first protocol data unit session anchor of a multi-access protocol data unit session, and steering the uplink data associated with the first protocol data unit session anchor based on the steering rule, wherein the multi-access protocol data unit session is associated with the first protocol data unit session anchor and a second protocol data unit session anchor.

Various embodiments may preferably implement the following features:

Preferably or in some embodiments, the steering rule is received in response to an insertion of a branching point or an uplink classifier in the multi-access protocol data unit session.

Preferably or in some embodiments, the steering rule indicates using an access traffic steering, switching, splitting, ATSSS, functionality to steer the uplink data associated with the first protocol data unit session anchor.

Preferably or in some embodiments, the steering rule indicates avoiding using a multipath transmission control protocol, MPTCP, functionality to steer the uplink data associated with the first protocol data unit session anchor.

Preferably or in some embodiments, the steering rule indicates steering the uplink data associated with the first protocol data unit session anchor to a branching point or an uplink classifier.

Preferably or in some embodiments, the branching point or the uplink classifier is comprised in the first protocol data unit session anchor or is deployed standalone.

Preferably or in some embodiments, the uplink data associated with the first protocol data unit session anchor comprises at least one of a prefix associated with the first protocol data unit session anchor or at least one internet protocol address associated with the first protocol data unit session anchor.

Preferably or in some embodiments, the wireless communication method further comprises receiving, from the session management function, an indication of removing the steering rule after a branching point or an uplink classifier associated with the first protocol data unit session anchor is removed.

The present disclosure relates to a wireless device comprising a session management function. The wireless device comprises a communication unit, configured to transmit, to a wireless terminal, a steering rule for uplink data associated with a first protocol data unit session anchor of a multi-access protocol data unit session, wherein the multi-access protocol data unit session is associated with the first protocol data unit session anchor and a second protocol data unit session anchor.

Various embodiments may preferably implement the following feature:

Preferably or in some embodiments, the wireless device further comprises a processor configured to perform any of the aforementioned wireless communication methods.

The present disclosure relates to a wireless terminal. The wireless terminal comprises:
  a communication unit, configured to receive, from a session management function, a steering rule for uplink data associated with a first protocol data unit session anchor of a multi-access protocol data unit session; and
  a processor, configured to steer the uplink data associated with the first protocol data unit session anchor based on the steering rule,
  wherein the multi-access protocol data unit session is associated with the first protocol data unit session anchor and a second protocol data unit session anchor.

Various embodiments may preferably implement the following features:

Preferably or in some embodiments, the processor is further configured to perform any of the aforementioned wireless communication methods.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
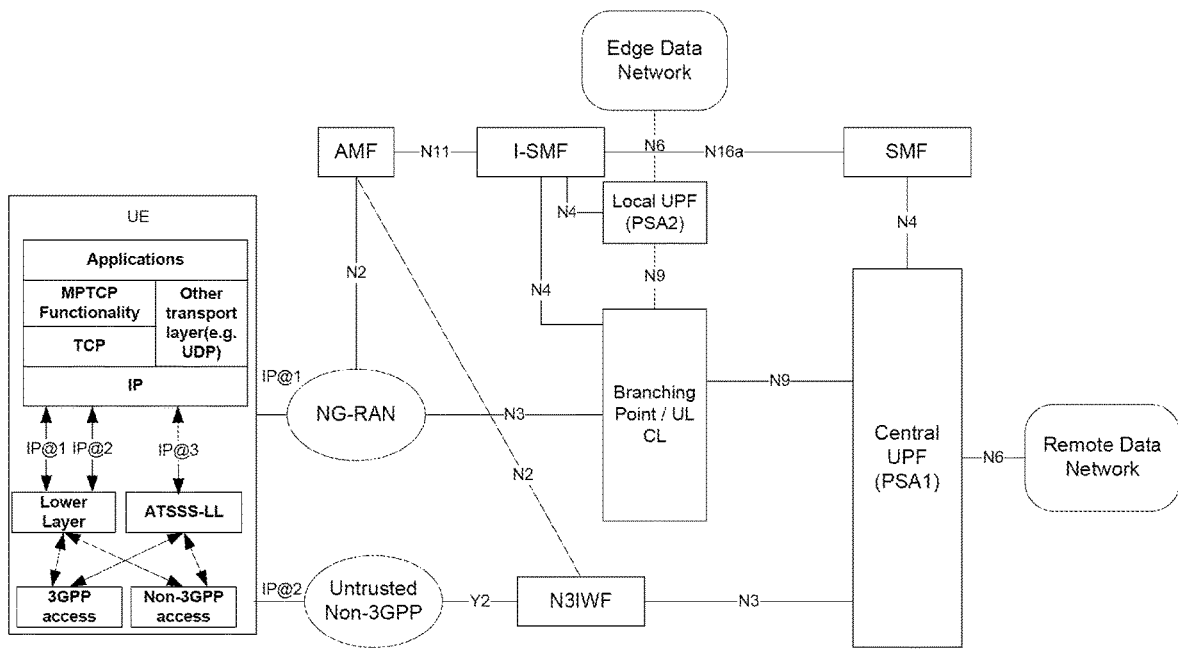
FIG. 1 shows a schematic diagram of a network architecture according to an embodiment of the present disclosure.
Figure 2:
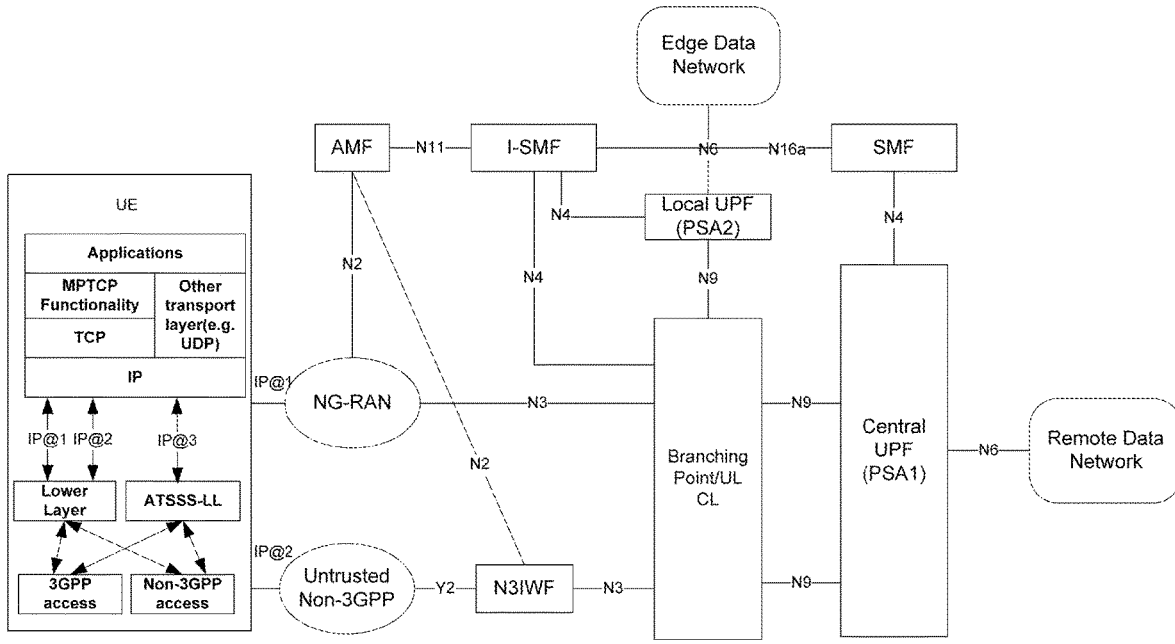
FIG. 2 shows a schematic diagram of a network architecture according to an embodiment of the present disclosure.

FIGS. 1 and 2 show schematic diagrams of a network architecture according to embodiments of the present disclosure. The network architectures shown in FIGS. 1 and 2 comprise the following network functions and entities:

1. UE (User Equipment):

The UE may be a wireless terminal, such as a tablet, a smart phone, a laptop, etc. In FIGS. 1 and 2, the UE accesses data networks (e.g. core networks) via 3GPP access and non-3GPP access. In addition, the UE may use an access traffic steering, switching, splitting (ATSSS) lower layer (ATSSS-LL) functionality or a multipath transmission control protocol (MPTCP) functionality to steer/distribute uplink traffics and/or downlink traffics via the 3GPP access and the non-3GPP access.

2. NG-RAN (Next Generation Radio Access Network):

The NG-RAN (node) is responsible for air interface resource scheduling and air interface connection management of the network to which the UE accesses. In the present disclosure, the NG-RAN (node) may refer to RAN (node) or a gNB.

3. AMF (Access and Mobility Management Function)

The AMF includes the following functionalities: registration management, connection management, reachability management and mobility management. The AMF also performs the access authentication and access authorization.

4. SMF (Session Management Function)

The SMF includes the following functionalities: session management (e.g. session establishment, modify and release), UE internet protocol (IP) address allocation & management, selection and control of user plane (UP) function, downlink data notification, etc.

5. UPF (User Plane Function)

The UPF includes the following functionalities: anchor point for intra-/inter-RAT mobility, packet routing & forwarding, traffic usage reporting, quality of service (QoS) handling for the UP, downlink packet buffering and downlink data notification triggering, etc.

6. N3IWF (Non-3GPP Interworking Function):

The N3IWF is responsible for interworking between untrusted non-3GPP networks and the data network.

7. I-SMF (Inserted SMF):

When the UE is outside of a service area of the SMF, the I-SMF is inserted between the SMF and the AMF.

In FIG. 1, the BP/UL CL is inserted in a data path of an MA PDU session, i.e. the data path through the NG-RAN. In this embodiment, the UE may first have the MA-PDU session over the NG-RAN (i.e. 3GPP access) and the N3IWF (i.e. non-3GPP access), wherein the MA PDU session has a PDU session anchor PSA1. In this embodiment, the PSA1 is located at central UPF. Based on certain events (e.g. UE mobility), the SMF may establish another PDU session anchor PSA2 for the MA PDU session. The PSA2 may be located at a local UPF. Under such conditions, the SMF inserts the BP/UL CL to the MA-PDU session, to correctly distribute the data from/to the UE. In FIG. 1, the BP/UL CL is inserted in the data path passing through the NG-RAN.

Different from the BP/UL CL in FIG. 1, the BP/UL CL in FIG. 2 is inserted in both the data paths corresponding to the NG-RAN and N3IWF (i.e. both the 3GPP access and the non-3GPP access).

In the present disclosure, the type of MA PDU session may be one of the following types: internet protocol version 4 (IPv4), internet protocol version 6 (IPv6), IPv4v6, and Ethernet.

Figure 3:
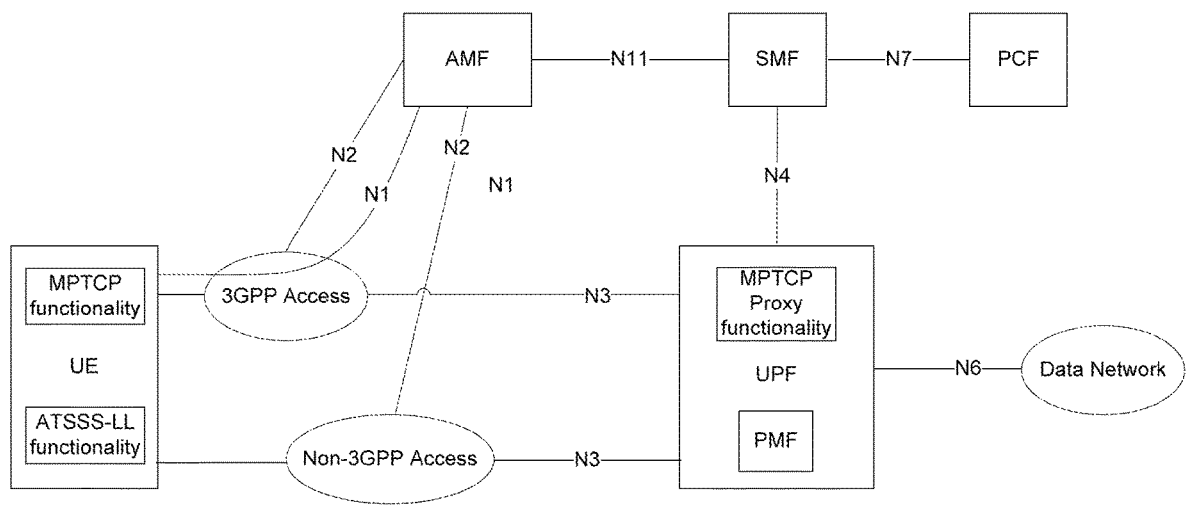
FIG. 3 shows a schematic diagram of a network architecture according to an embodiment of the present disclosure.

FIG. 3 shows a schematic diagram of a network architecture according to an embodiment of the present disclosure. The architecture shown in FIG. 3 comprises the following features:

A) The UE supports one or more of the steering functionalities, e.g. MPTCP functionality and/or ATSSS-LL (ATSSS lower layer) functionality. Each steering functionality in the UE enables traffic steering, switching and splitting across the 3GPP access and the non-3GPP access, in accordance with the ATSSS rules provided by the network. The ATSSS-LL functionality is mandatory in the UE for the MA PDU session of type Ethernet.

B) The UPF may support MPTCP proxy functionality, which communicates with the MPTCP functionality in the UE by using the MPTCP protocol.

C) The UPF may support ATSSS-LL functionality, which is similar to the ATSSS-LL functionality defined for the UE. There is no user plane protocol defined between the ATSSS-LL functionality in the UE and the ATSSS-LL functionality in the UPF. The ATSSS-LL functionality in the UPF is not shown in FIG. 3.

D) The UPF supports a performance measurement functionality (PMF), which may be used by the UE to obtain access performance measurements over the user-plane of the 3GPP access and/or over the user-plane of the non-3GPP access.

Figure 4:
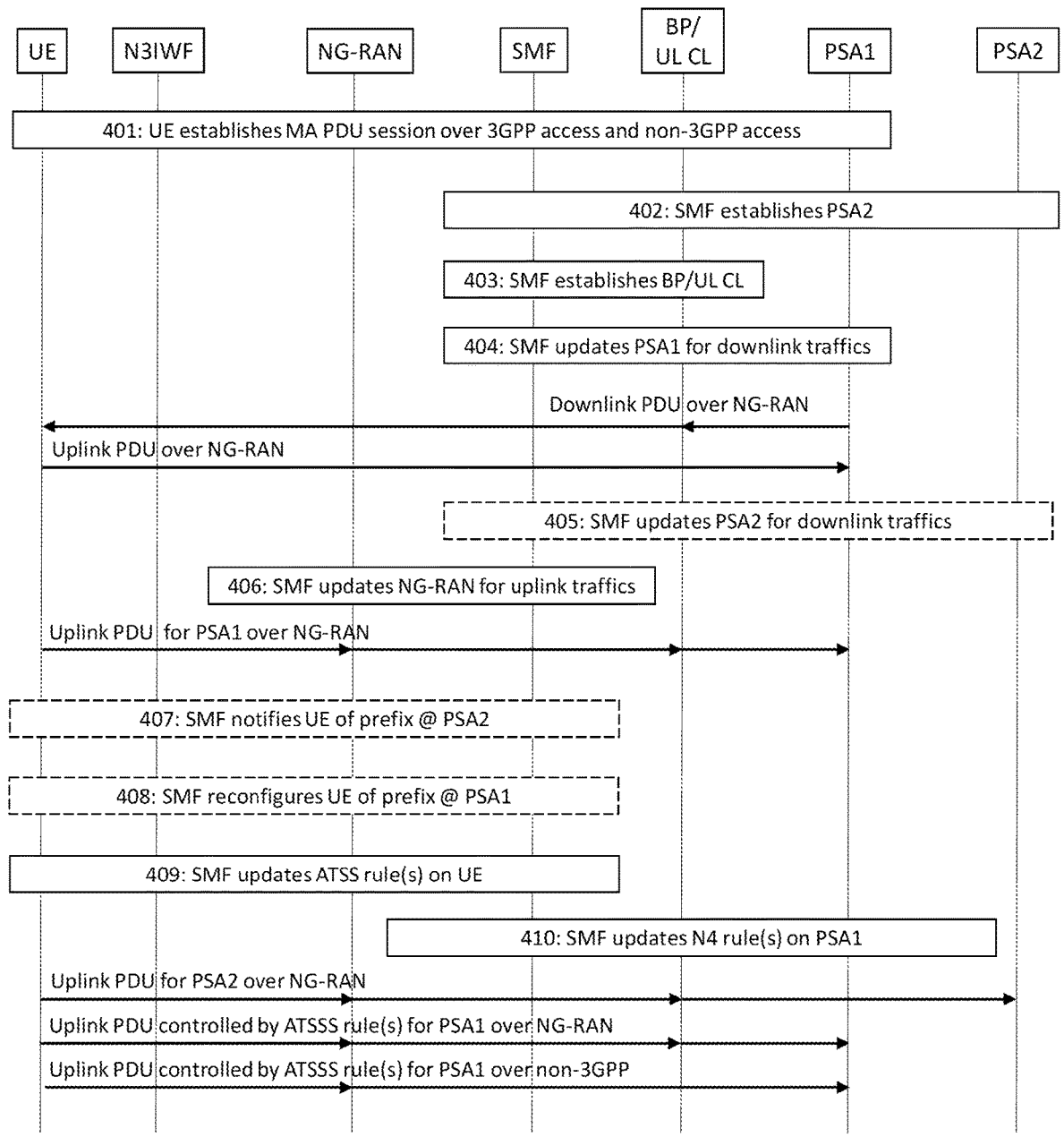
FIG. 4 shows a schematic diagram of a procedure according to an embodiment of the present disclosure.

FIG. 4 shows a schematic diagram of a procedure of insertion of a BP/UL CL in the data path of an MA PDU session according to an embodiment of the present disclosure. In this procedure, the BP/UL CL is inserted in the user plane path of the MA PDU session on the NG-RAN as shown in FIG. 1. The network needs to adjust the ATSSS policy (e.g. ATSSS rules) to make sure that the distributed traffic is routed correctly because of the insertion of the BP/UL CL. In detail, the procedure comprises the following steps:

Step 401: The UE has an established MA PDU session or establishes a MA PDU session over the NG-RAN (i.e. 3GPP access) and the N3IWF (i.e. non-3GPP access), wherein the MA PDU session has a (central) UPF including a PDU session anchor (i.e. PSA1 shown in FIG. 1). The UE distributes the uplink traffic on the MA PDU session over the NG-RAN and N3IWF based on the ATSSS rules provided by the SMF. The PSA1 distributes the downlink traffic on the MA PDU session over the NG-RAN and the N3IWF based on the ATSSS N4 rules provided by the SMF.

Step 402: The SMF decides to establish a new PDU session anchor (i.e. PSA2 shown in FIG. 1), e.g. due to UE mobility or new flow detection. The SMF selects a (local) UPF and using N4 to establish the new PSA2 to the MA PDU session. In the case of the IPv6 multi-homing PDU session, the SMF also ensures that a new IPv6 prefix corresponding to the PSA2 is allocated. In addition, if the PCF has subscribed the IP allocation/release event, the SMF performs a session management policy modification procedure, to provide the new allocated IPv6 prefix to the PCF.

Step 403: The SMF selects the local UPF and using the N4 to establish the BP (in the case of IPv6 multi-homing) or the UL CL for the MA PDU session. The SMF provides necessary uplink forwarding rules towards the PSA1 and the PSA2, which include PSA1 CN tunnel information (Info) and the PSA2 CN tunnel Info. In addition, the AN (i.e. NG-RAN) tunnel Info is provided for downlink forwarding. In the case of the IPv6 multi-homing, the SMF provides traffic filters for the IPv6 prefixes corresponding to the PSA1 and the PSA2, wherein the traffic filters indicate what traffic shall be forwarded towards the PSA1 and the PSA2 respectively.

In the case of the UL CL, the SMF provides the traffic filters indicating what traffic shall be forwarded towards the PSA1 and the PSA2 respectively.

In an embodiment of the BP/UL CL and the PSA2 are co-located in single UPF (i.e. the local UPF), steps 402 and 403 may be merged.

In an embodiment of the BP having been allocated, step 403 is skipped.

Step 404: The SMF updates the information of the BP/UL CL to the PSA1 via the N4. For example, the SMF provides the CN tunnel Info for the downlink traffic to the PSA1, wherein the CN tunnel Info comprises the information of the BP/UL CL.

In an embodiment of the BP/UL CL and the PSA1 are co-located in a single UPF (i.e. central UPF), steps 403 and 404 may be merged.

Step 405: The SMF updates the information of the BP/UL CL to the PSA2 via the N4. For example, the SMF provides the CN tunnel Info for the downlink traffic to the PSA2, wherein the CN tunnel Info comprises the information of the BP/UL CL.

In an embodiment of the BP/UL CL and the PSA2 are co-located in a single UPF (i.e. local UPF), step 405 may be omitted.

Step 406: The SMF updates the information of the BP/UL CL to the NG-RAN via the N2 SM information over the N11. For example, the SMF provides the new CN tunnel Info corresponding to the UPF (i.e. corresponding to the BP or the UL CL).

Step 407: In the case of the IPv6 multi-homing, the SMF notifies the UE of the availability of the new IP prefix corresponding to the PSA2, e.g. by using an IPv6 router advertisement message (e.g. RFC 4861 neighbor discovery in IPv6). In addition, the SMF sends a IPv6 multi-homed routing rule along with the IPv6 prefix to the UE by using an IPv6 router advertisement message (e.g. RFC 4191 neighbor discovery in IPv6).

Step 408: In the case of the IPv6 multi-homing, the SMF may re-configure the UE for the original IP prefix corresponding to the PSA1. That is, the SMF sends the IPv6 multi-homed routing rule along with the IPv6 prefix corresponding to the PSA1 to the UE by using an IPv6 router advertisement message.

Step 409: The SMF notifies the UE of the updated ATSSS rules. In the case of the IPv6 multi-homing, the updated ATSSS rules (shall) contain the rules which ensure that all the uplink traffic having the new IP prefix (allocated in step 407 for the PSA2) as the source IP address is steered with the steering functionality (e.g. ATSSS-LL functionality) other than the MPTCP functionality and/or is routed over the NG-RAN. In the case of the UL CL, the updated ATSSS rules (shall) contain the rules which ensure that all uplink traffic with the destination IP address or the prefix of being forwarded towards the PSA2 (via the UL CL) is steered with the steering functionality (e.g. ATSSS-LL functionality) other than the MPTCP functionality and/or is routed over the NG-RAN.

For example, the ATSSS rule for steering the uplink traffic to the PSA2 via the BP may be expressed as: (In this embodiment, the new prefix for PSA2 is 2001::/64)
"Traffic Descriptor: SourceAddress 2001::", "Steering Mode: Load-Balancing, 3GPP=100%, non-3GPP=0%", "Steering Functionality: ATSSS-LL":
This rule means "send 100% of the traffic with prefix 2001:: as source IP address to 3GPP access by using the ATSSS-LL functionality".

In an embodiment, the ATSSS rule for steering the uplink traffic to the PSA2 via the UL CL may be expressed as:
"Traffic Descriptor: TCP, DestAddress 1.2.3.4", "Steering Mode: Active-Standby, Active=3GPP, Standby=NA", "Steering Functionality: ATSSS-LL":
In this embodiment, the destination IP address 1.2.3.4 is in the forwarding rules towards PSA2 in the UL CL. This rule represents that "steer TCP traffic with destination address 1.2.3.4 to the access to the active access (3GPP) only by using the ATSSS-LL functionality".

Step 410: The SMF notifies the PSA1 of the updated N4 rules for ATSSS downlink traffic distribution accordingly.

Figure 5:
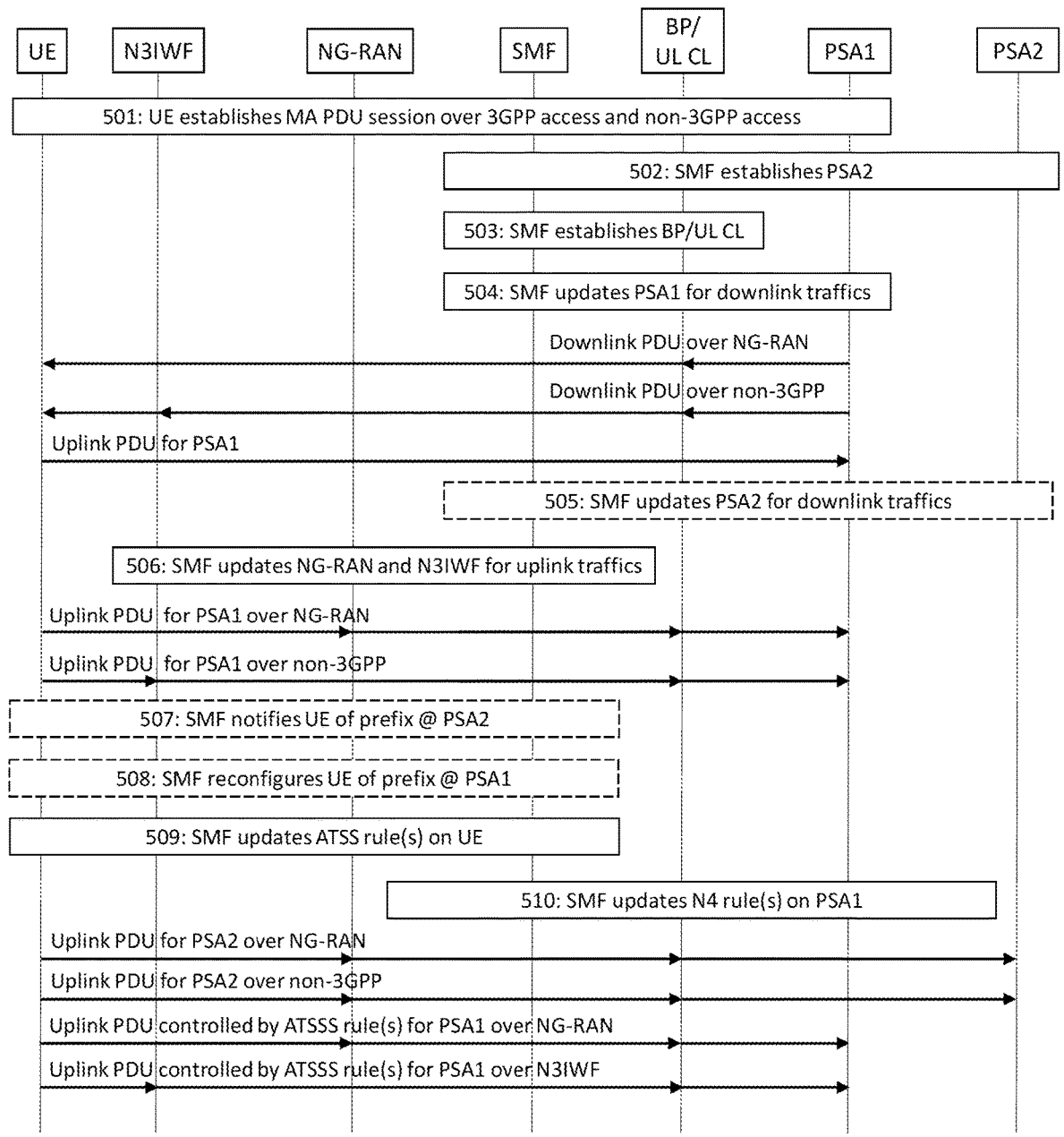
FIG. 5 shows a schematic diagram of a procedure according to an embodiment of the present disclosure.

FIG. 5 shows a schematic diagram of a procedure of insertion of a BP or a UL CL in the data path of an MA PDU session according to an embodiment of the present disclosure. In the procedure shown in FIG. 5, the BP/UL CL is inserted in the user plane paths of the MA PDU session on the NG-RAN and the N3IWF as shown in FIG. 2. Under such conditions, the network needs to adjust the ATSSS policy (i.e. ATSSS rules) to ensure that the distributed traffic is routed correctly due to this BP/UL CL insertion.

Specifically, the steps 501 to 504 are similar to the steps 401 to 404 shown in FIG. 4 with the following additions:
In step 503, the AN tunnel Info is transmitted to not only the NG-RAN but also the N3IWF. The AN tunnel info for both the NG-RAN and the N3IWF is provided for downlink forwarding.
After step 504, the downlink traffics are distributed based on the ATSSS N4 rules through the BP/UL CL over the NG-RAN and the N3IWF.

Steps 505 to 508 are similar to steps 405 to 408 with the following addition:
In step 506, the SMF updates the information of the BP/UL CL to the NG-RAN and the N3IWF via N2 SM information over N11 respectively. For example, the SMF provides new CN Tunnel Info corresponding to the local UPF (e.g. BP or UL CL).

Step 509: The SMF notifies the UE the updated ATSSS rules.

In the case of the IPv6 multi-homing, the updated ATSSS rules (shall) contain the rules which guarantee that all the uplink traffic having the new IP prefix (allocated in step 507) as the source IP address is steered with the steering functionality (e.g. ATSSS-LL functionality) other than the MPTCP functionality.

In the case of the UL CL, the updated ATSSS rules (shall) contain the rules which can make sure that all uplink traffic having the destination IP address or prefix to be forwarded towards the PSA2 (via UL CL) is steered with the steering functionality other than MPTCP functionality.

In an embodiment, the ATSSS rule for the uplink traffic to PSA2 via the BP may be expressed by: (in this embodiment, the new prefix for the PSA2 is 2001::/64):
"Traffic Descriptor: SourceAddress 2001::", "Steering Mode: Active-Standby, Active=3GPP, Standby=non-3GPP", "Steering Functionality: ATSSS-LL":
In this embodiment, the ATSSS rule means "using the ATSSS-LL functionality to steer the traffic with source IP address 2001:: to the active access (3GPP), if available. If the active access is not available, non-3GPP access is used."

In an embodiment, the ATSSS rule for the uplink traffic to the PSA2 via the UL CL may be expressed as:
"Traffic Descriptor: TCP, DestAddress 1.2.3.4", "Steering Mode: 3GPP is high priority access", "Steering Functionality: ATSSS-LL":
In this embodiment, the Destination IP address 1.2.3.4 is in the forwarding rules towards the PSA2 in the UL CL. This rule means that "using the ATSSS-LL functionality to steer TCP traffic with destination address 1.2.3.4 to 3GPP access unless congestion takes place over 3GPP access."

Step 510: The SMF notifies the PSA1 of the updated N4 rules for the ATSSS downlink traffic distribution. In addition, if the PSA2 supports ATSSS-LL functionality, the SMF may send the N4 rules for the ATSSS downlink traffic distribution to the PSA2.

In an embodiment, when the BP or UL CL in the data path of the MA PDU session is removed, the SMF updates the ATSSS rules stored in the UE as well as the N4 rules stored in the PSA1.

In the present disclosure, when the BP/UL CL is inserted in the data path(s) of the MA PDU session, the SMF notifies the UE of the updated ATSSS rules.

In an embodiment of the BP/UL CL being inserted on one data path of the MA PDU session:

In the case of the IPv6 multi-homing, the updated ATSSS rules contain the rules which indicate that all the uplink traffic having the new IP prefix (which is allocated for PSA2) as the source IP address is steered with the steering functionality (e.g. ATSSS-LL functionality) rather than the MPTCP functionality and/or is routed over the data path in which the BP is inserted;

In the case of UL CL, the updated ATSSS rules contain the rules which indicate that all uplink traffic having the specific destination IP address or prefix associated with the PSA2 (i.e. the uplink traffic forwarded towards the PSA2 (via the UL CL)) is steered with the steering functionality (e.g. ATSSS-LL functionality) other than the MPTCP functionality and/or is routed over the data path in which the UL CL is inserted.

In an embodiment of the BP/UL CL being inserted in two data paths of the MA PDU session:

In the case of the IPv6 multi-homing, the updated ATSSS rules contain the rules which can make sure that all the uplink traffic with the new IP prefix (allocated for PSA2) as source IP address is steered with the steering functionality (e.g. ATSSS-LL functionality) other than the MPTCP functionality;

In the case of the UL CL, the updated ATSSS rules contain the rules indicate that all uplink traffic with the destination IP address or prefix associated with the PSA2 (i.e. the uplink traffic forwarded towards the PSA2 (via the UL CL)) is steered with the steering functionality (e.g. ATSSS-LL functionality) other than MPTCP functionality.

In addition, if the PSA2 supports the ATSSS-LL functionality, the SMF may send the N4 rules for the ATSSS downlink traffic distribution to the PSA2

In the present disclosure, the source IP address/prefix or local IP address/prefix may be one type of traffic descriptor component in the ATSSS rule. The source/local IP address/prefix refers to the source address of the uplink packet sent by the UE.

In an embodiment, when the BP or the UL CL inserted in the data path(s) of the MA PDU session is removed, the SMF updates the ATSSS rules stored in the UE and/or the N4 rules stored in the PSA1.

Figure 6:
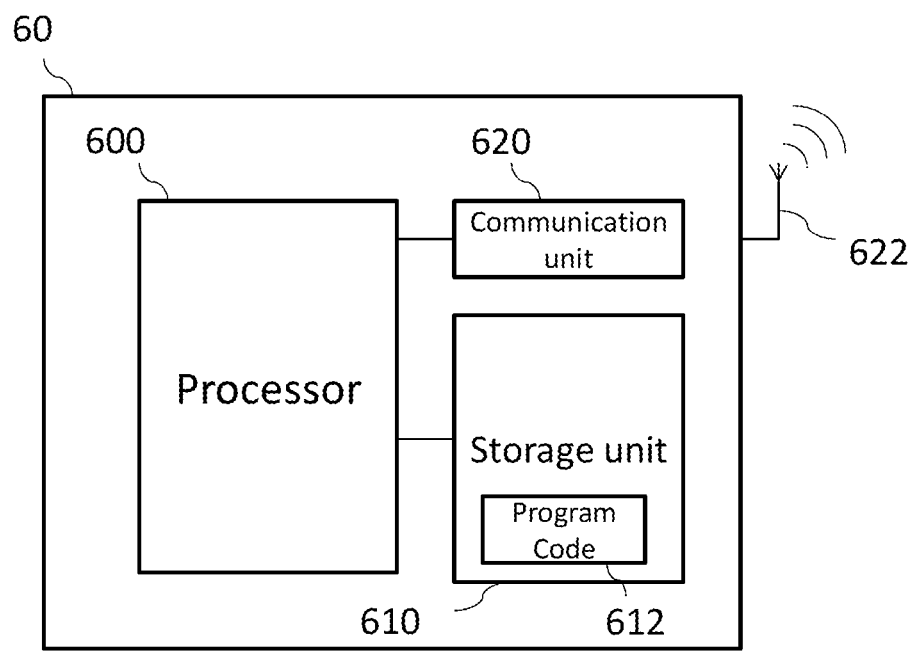
FIG. 6 shows an example of a schematic diagram of a wireless terminal according to an embodiment of the present disclosure.

FIG. 6 relates to a schematic diagram of a wireless terminal 60 according to an embodiment of the present disclosure. The wireless terminal 60 may be a user equipment (UE), a mobile phone, a laptop, a tablet computer, an electronic book or a portable computer system and is not limited herein. The wireless terminal 60 may include a processor 600 such as a microprocessor or Application Specific Integrated Circuit (ASIC), a storage unit 610 and a communication unit 620. The storage unit 610 may be any data storage device that stores a program code 612, which is accessed and executed by the processor 600. Embodiments of the storage unit 612 include but are not limited to a subscriber identity module (SIM), read-only memory (ROM), flash memory, random-access memory (RAM), hard-disk, and optical data storage device. The communication unit 620 may a transceiver and is used to transmit and receive signals (e.g. messages or packets) according to processing results of the processor 600. In an embodiment, the communication unit 620 transmits and receives the signals via at least one antenna 622 shown in FIG. 6.

In an embodiment, the storage unit 610 and the program code 612 may be omitted and the processor 600 may include a storage unit with stored program code.

The processor 600 may implement any one of the steps in exemplified embodiments on the wireless terminal 60, e.g., by executing the program code 612.

The communication unit 620 may be a transceiver. The communication unit 620 may as an alternative or in addition be combining a transmitting unit and a receiving unit configured to transmit and to receive, respectively, signals to and from a wireless network node (e.g. a base station).

Figure 7:
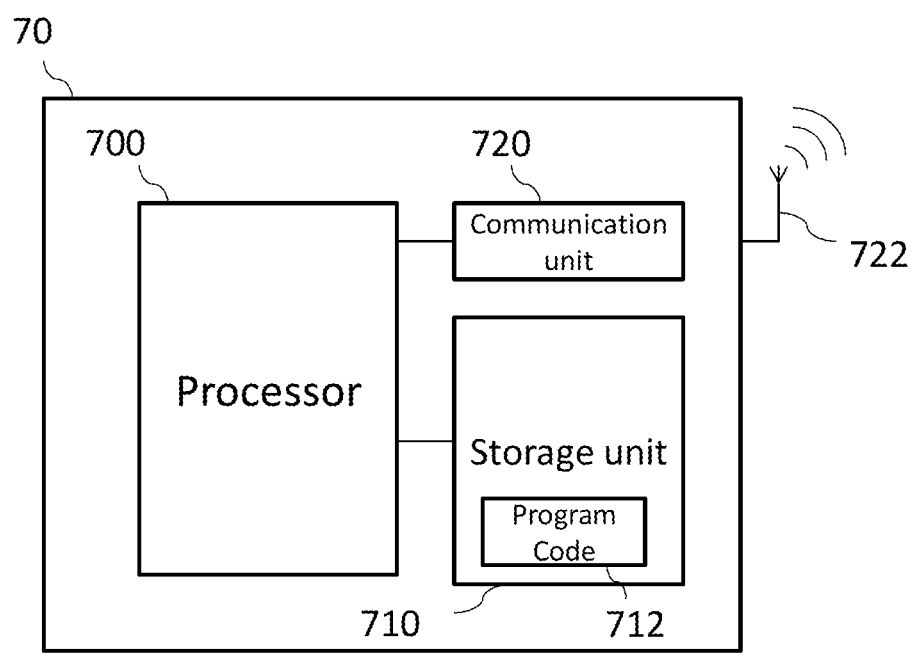
FIG. 7 shows an example of a schematic diagram of a wireless network node according to an embodiment of the present disclosure.

FIG. 7 relates to a schematic diagram of a wireless network node 70 according to an embodiment of the present disclosure. The wireless network node 70 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 70 may comprise (perform) at least one network function such as an access and mobility management function (AMF), a session management function (SMF), a user place function (UPF), a policy control function (PCF), an application function (AF), etc. The wireless network node 70 may include a processor 700 such as a microprocessor or ASIC, a storage unit 710 and a communication unit 720. The storage unit 710 may be any data storage device that stores a program code 712, which is accessed and executed by the processor 700. Examples of the storage unit 712 include but are not limited to a SIM, ROM, flash memory, RAM, hard-disk, and optical data storage device. The communication unit 720 may be a transceiver and is used to transmit and receive signals (e.g. messages or packets) according to processing results of the processor 700. In an example, the communication unit 720 transmits and receives the signals via at least one antenna 722 shown in FIG. 7.

In an embodiment, the storage unit 710 and the program code 712 may be omitted. The processor 700 may include a storage unit with stored program code.

The processor 700 may implement any steps described in exemplified embodiments on the wireless network node 70, e.g., via executing the program code 712.

The communication unit 720 may be a transceiver. The communication unit 720 may as an alternative or in addition be combining a transmitting unit and a receiving unit configured to transmit and to receive, respectively, signals to and from a wireless terminal (e.g. a user equipment or another wireless network node).

Figure 8:
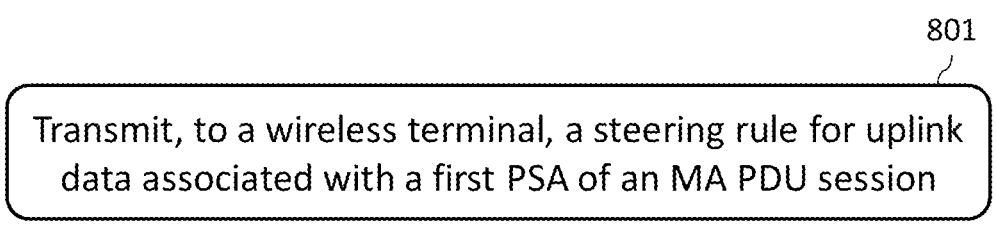
FIG. 8 shows a flowchart of a method according to an embodiment of the present disclosure.

FIG. 8 shows a flowchart of a method according to an embodiment of the present disclosure. The method shown in FIG. 8 may be used in an SMF (e.g. a wireless device comprising the SMF or a wireless device performing the functionalities of the SMF) and comprises the following step:

Step 801: Transmit, to a wireless terminal, a steering rule for uplink data associated with a first PSA of an MA PDU session.

Specifically, the SMF transmits a steering rule for uplink data associated with a first PSA (e.g. PSA2 shown in FIG. 1 or 2) of an MA PDU session. In this embodiment, the MA PDU session is associated with (e.g. comprises, has) two PSAs, i.e. the first PSA and a second PSA (e.g. PSA1 shown in FIG. 1 or 2).

For example, the MA PDU session may be established for the UE and include the second PSA. Due to certain events (e.g. UE mobility), the SMF establishes the first PSA in the MA PDU session. Under such conditions, the SMF inserts a BP or ULCL in data path(s) of the MA PDU. In response to the insertion of the BP/UL CL and/or the establishment of the first PSA, the SMF transmits the steering rule associated with the first PSA to the wireless terminal, e.g., to make the wireless terminal correctly distribute the uplink data associated with the first PSA.

In an embodiment, the steering rule indicates using an ATSSS functionality (e.g. ATSSS-LL functionality) to steer the uplink data associated with the first PSA. In an embodiment, the steering rule indicates avoiding using an MPTCP functionality to steer the uplink data associated with the first PSA.

In an embodiment, the steering rule indicates steering the uplink data associated with the first PSA to a BP/UL CL.

In an embodiment, the BP/UL CL may be comprised in the first PSA or is deployed standalone.

In an embodiment, the uplink data associated with the first PSA comprises a prefix associated with (e.g. assigned for) the first PSA. For example, prefix associated with the first PSA refers to a source IP prefix of the uplink data (e.g. UE packet).

In an embodiment, the uplink data associated with the first PSA comprises at least one IP address associated with the first PSA. For instance, the IP address associated with the first PSA refers to a destination IP address of the uplink data (e.g. UE packet). In an embodiment, the at least one IP address associated with the first PSA may comprise destination IP address(es) associated with the BP/UL CL.

In an embodiment, the SMF may further transmit tunnel information associated with the inserted BP/UL CL associated with the first PSA to both a wireless network node (e.g. NG-RAN node) and a gateway (e.g. N3IWF), wherein the wireless terminal accesses the data network via the wireless network node and the gateway (i.e. 3GPP access and non-3GPP access).

In an embodiment, the SMF transmits the steering rule to the second PSA.

In an embodiment, the SMF transmits an indication of removing the steering rule to the wireless terminal and/or the second PSA after (e.g. when, no later than or in response to) a BP or UL CL associated with the first PSA and/or the first PSA is removed from the MA PDU session.

Figure 9:
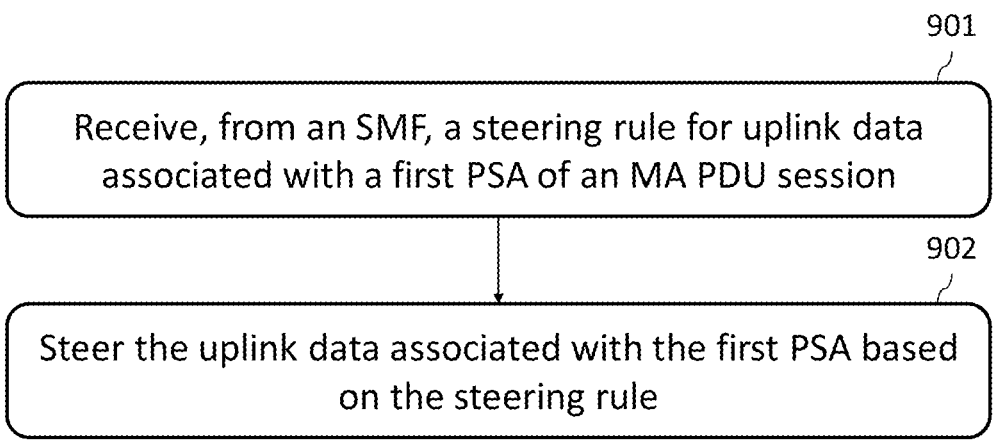
FIG. 9 shows a flowchart of a method according to an embodiment of the present disclosure.

FIG. 9 shows a flowchart of a method according to an embodiment of the present disclosure. The method shown in FIG. 9 may be used in a wireless terminal (e.g. UE) and comprises the following steps:

Step 901: Receive, from an SMF, a steering rule for uplink data associated with a first PSA of an MA PDU session.

Step 902: Steer the uplink data associated with the first PSA based on the steering rule.

In FIG. 9, the wireless terminal receives a steering rule for uplink data associated with a first PSA of an MA PDU session from an SMF. In this embodiment, the MA PDU session comprises/includes two PSAs, i.e. the first PSA (e.g. PSA 2 shown in FIG. 1 or 2) and a second PSA (e.g. PSA1 shown in FIG. 1 or 2). The wireless terminal steers the uplink data associated with the first PSA based on the steering rule.

In an embodiment, the wireless terminal may establish or have the MA PDU session comprising/including the second PSA. Due to certain events (e.g. UE mobility), an additional PSA (i.e. first PSA) may be established in the MA PDU session. Under such conditions, a BP or UL CL may be inserted in (data path(s) of) the MA PDU session. In response to the insertion of BP or UL CL and/or the establishment of the first PSA, the steer rule is received by the wireless terminal.

In an embodiment, the steering rule indicates using an ATSSS functionality (e.g. ATSSS-LL functionality) to steer the uplink data associated with the first PSA.

In an embodiment, the steering rule indicates avoiding using an MPTCP functionality to steer the uplink data associated with the first PSA.

In an embodiment, the steering rule indicates steering the uplink data associated with the first PSA to a BP/UL CL.

In an embodiment, the BP/UL CL may be comprised in the first PSA or is deployed standalone.

In an embodiment, the uplink data associated with the first PSA comprises a prefix associated with (e.g. assigned for) the first PSA. For example, prefix associated with the first PSA refers to a source IP prefix of the uplink data (e.g. UE packet).

In an embodiment, the uplink data associated with the first PSA comprises at least one IP address associated with the first PSA. For instance, the IP address associated with the first PSA refers to a destination IP address of the uplink data (e.g. UE packet). In an embodiment, the at least one IP address associated with the first PSA may comprise destination IP address(es) associated with the BP/UL CL.

In an embodiment, the wireless terminal receives an indication of removing the steering rule from the SMF after (e.g. when, no later than or in response to) the first PSA is removed and/or the BP/UL CL is removed from the MA PDU session.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a session management function, the method comprising:
   transmitting, to a wireless terminal, a steering rule for uplink data associated with a first protocol data unit session anchor of a multi-access protocol data unit session,
   wherein the multi-access protocol data unit session is associated with the first protocol data unit session anchor and a second protocol data unit session anchor,
   wherein the steering rule is transmitted in response to an insertion of a branching point or an uplink classifier in the multi-access protocol data unit session, and
   wherein the steering rule indicates avoiding using a multipath transmission control protocol (MPTCP) functionality to steer the uplink data associated with the first protocol data unit session anchor.

2. The wireless communication method of claim 1, wherein the steering rule indicates using an access traffic steering, switching, splitting (ATSSS) functionality to steer the uplink data associated with the first protocol data unit session anchor.

3. The wireless communication method of claim 1, wherein the steering rule indicates steering the uplink data associated with the first protocol data unit session anchor to a branching point or an uplink classifier.

4. The wireless communication method of claim 3, wherein the branching point or the uplink classifier is comprised in the first protocol data unit session anchor or is deployed standalone.

5. The wireless communication method of claim 1, wherein the uplink data associated with the first protocol data unit session anchor comprises at least one of a prefix associated with the first protocol data unit session anchor or at least one internet protocol address associated with the first protocol data unit session anchor.

6. The wireless communication method of claim 1, further comprising:

transmitting, to a wireless network node and a gateway via which the wireless terminal accesses to a data network, tunnel information associated with a branching point or an uplink classifier associated with the first protocol data unit session anchor.

7. The wireless communication method of claim 1, further comprising:
transmitting, to the second protocol data unit session anchor, the steering rule.

8. The wireless communication method of claim 1, further comprising:
transmitting, to at least one of the wireless terminal or the second protocol data unit session anchor, an indication of removing the steering rule after a branching point or an uplink classifier associated with the first protocol data unit session anchor is removed.

9. A wireless communication method for use in a wireless terminal, the method comprising:
receiving, from a session management function, a steering rule for uplink data associated with a first protocol data unit session anchor of a multi-access protocol data unit session, and
steering the uplink data associated with the first protocol data unit session anchor based on the steering rule,
wherein the multi-access protocol data unit session is associated with the first protocol data unit session anchor and a second protocol data unit session anchor,
wherein the steering rule is received in response to an insertion of a branching point or an uplink classifier in the multi-access protocol data unit session, and
wherein the steering rule indicates avoiding using a multipath transmission control protocol (MPTCP) functionality to steer the uplink data associated with the first protocol data unit session anchor.

10. The wireless communication method of claim 9, wherein the steering rule indicates using an access traffic steering, switching, splitting (ATSSS) functionality to steer the uplink data associated with the first protocol data unit session anchor.

11. The wireless communication method of claim 9, wherein the steering rule indicates steering the uplink data associated with the first protocol data unit session anchor to a branching point or an uplink classifier.

12. The wireless communication method of claim 11, wherein the branching point or the uplink classifier is comprised in the first protocol data unit session anchor or is deployed standalone.

13. The wireless communication method of claim 9, wherein the uplink data associated with the first protocol data unit session anchor comprises at least one of a prefix associated with the first protocol data unit session anchor or at least one internet protocol address associated with the first protocol data unit session anchor.

14. The wireless communication method of claim 9, further comprising:
receiving, from the session management function, an indication of removing the steering rule after a branching point or an uplink classifier associated with the first protocol data unit session anchor is removed.

15. A wireless device comprising a session management function, the wireless device comprising:
a communication unit, configured to transmit, to a wireless terminal, a steering rule for uplink data associated with a first protocol data unit session anchor of a multi-access protocol data unit session,
wherein the multi-access protocol data unit session is associated with the first protocol data unit session anchor and a second protocol data unit session anchor,
wherein the steering rule is transmitted in response to an insertion of a branching point or an uplink classifier in the multi-access protocol data unit session, and
wherein the steering rule indicates avoiding using a multipath transmission control protocol (MPTCP) functionality to steer the uplink data associated with the first protocol data unit session anchor.

16. A wireless terminal, comprising:
a communication unit, configured to receive, from a session management function, a steering rule for uplink data associated with a first protocol data unit session anchor of a multi- access protocol data unit session; and
a processor, configured to steer the uplink data associated with the first protocol data unit session anchor based on the steering rule,
wherein the multi-access protocol data unit session is associated with the first protocol data unit session anchor and a second protocol data unit session anchor,
wherein the steering rule is received in response to an insertion of a branching point or an uplink classifier in the multi-access protocol data unit session, and
wherein the steering rule indicates avoiding using a multipath transmission control protocol (MPTCP) functionality to steer the uplink data associated with the first protocol data unit session anchor.

* * * * *